April 25, 1944.  L. CRITSER ET AL  2,347,541
TIRE PRESSURE INDICATOR
Filed Dec. 23, 1941  2 Sheets-Sheet 1
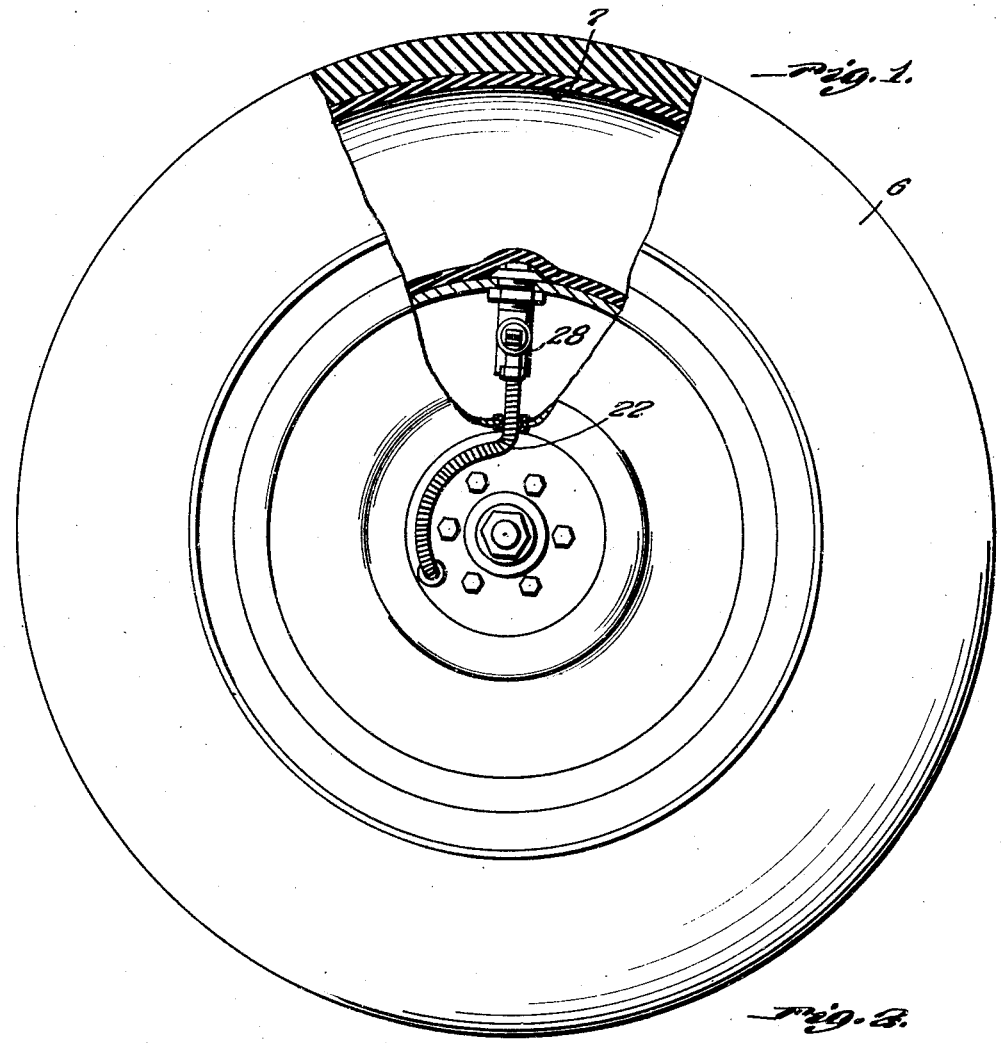
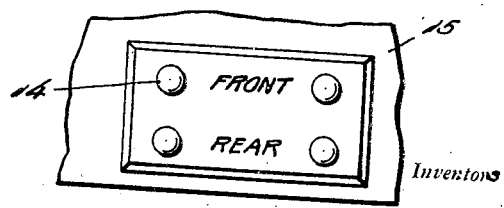
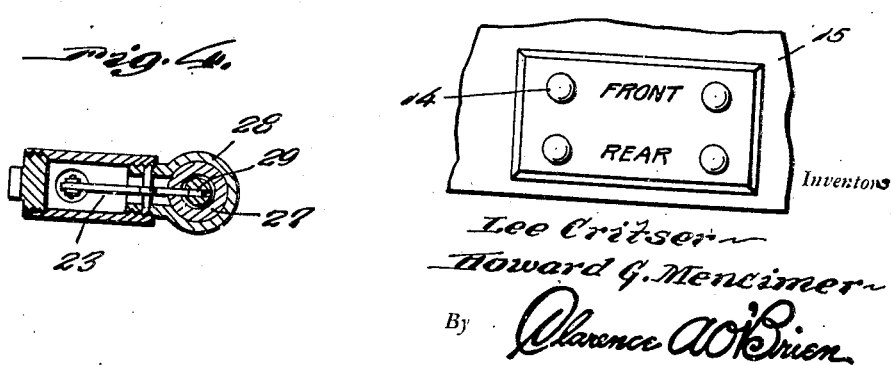

April 25, 1944.  L. CRITSER ET AL  2,347,541
TIRE PRESSURE INDICATOR
Filed Dec. 23, 1941   2 Sheets-Sheet 2

Inventors
Lee Critser
Howard G. Menzimer
By Clarence A. O'Brien
Attorney.

Patented Apr. 25, 1944

2,347,541

UNITED STATES PATENT OFFICE 2,347,541

TIRE PRESSURE INDICATOR

Lee Critser, Denver, and Howard G. Mencimer, Fort Lupton, Colo., assignors to Automatic Air Gauge, Inc., Keenesburg, Colo., a corporation Application December 23, 1941, Serial No. 424,176

3 Claims. (Cl. 200—58)

The present invention relates to new and useful improvements in tire pressure indicators and more particularly to a device for indicating to the driver of a vehicle when one of the tires thereof drops below a certain predetermined pressure.

A further object of the invention is to provide an indicator switch mechanism for the tire adapted to close a circuit leading to a signal lamp on the instrument panel of the vehicle and which embodies simplicity of construction and at the same time is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view of a vehicle tire with parts broken away and shown in section and illustrating the indicator switch mounted therein.

Figure 2 is a fragmentary front elevational view of the lamp panel for the signal device.

Figure 4 is a sectional view through the housing for the plunger of the switch taken substantially on a line 4—4 of Figure 3.

Figures 3, 5, 6:
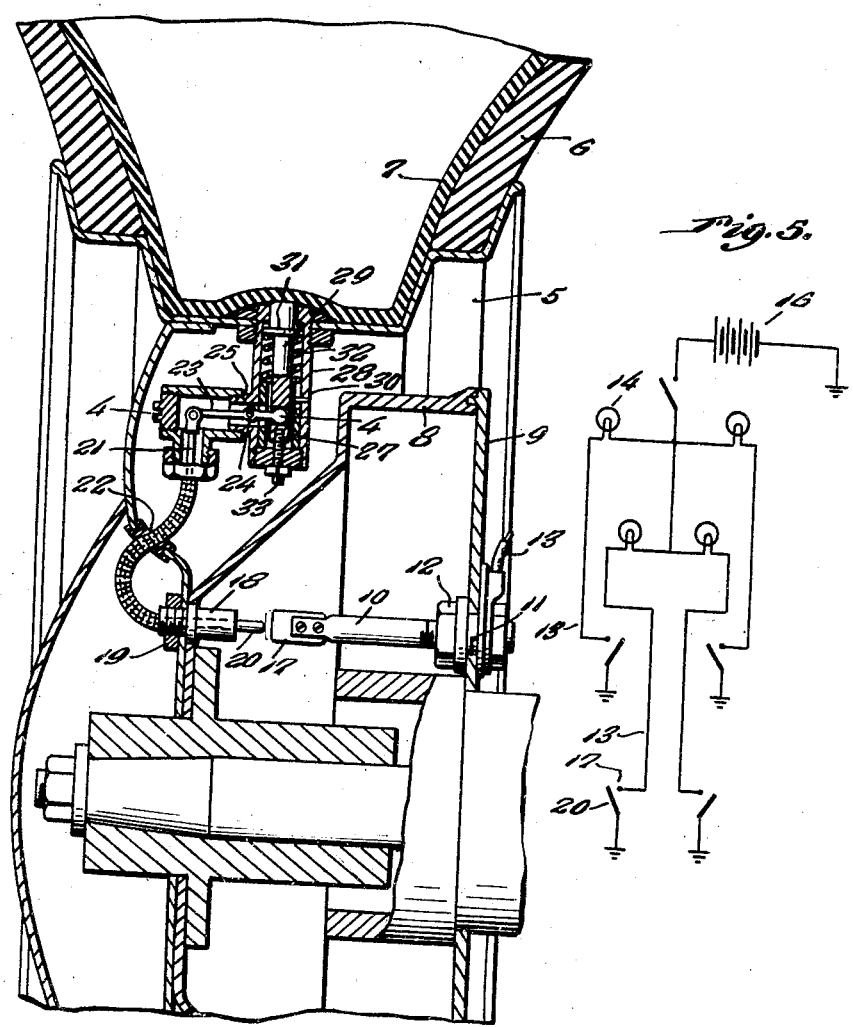
Figure 3 is a fragmentary vertical sectional view through the tire showing the signal switch mounted therein.
Figure 5 illustrates the electrical diagram for the lamps of the respective vehicle wheels.
Figure 6 is a perspective view of the guide for the plunger of the switch.

Referring now to the drawings in detail wherein for the purpose of illustration we have disclosed a preferred embodiment of the invention, the numeral 5 designates a vehicle wheel on which the pneumatic tire 6 is mounted and having the inner tube 7 of conventional construction. The wheel includes the brake drum 8 having the backing plate 9 through which is inserted an electrical brush-supporting arm 10 mounted in an insulation bushing 11 in the backing plate, the supporting arm being secured in position by nuts 12. To the outer end of the arm is attached a circuit wire 13 leading to a lamp 14 mounted on the instrument panel 15 of the vehicle, the lamp being electrically connected with the battery 16 of the vehicle.

The brush-supporting arm 10 projects inwardly of the brake drum housing 8 and is provided on its inner end with a resilient metal brush 17.

The brake drum housing 8 is also provided with a tubular guide 18 secured thereto by a nut 19 and in which is slidably mounted a plunger 20 normally spaced from the brush 17 during the rotation of the wheel.

The plunger 20 is carried at one end of a flexible shaft 21 mounted in a flexible housing 22 positioned in the wheel, the other end of the shaft being pivotally connected to one end of a lever 23 pivoted intermediate its ends as at 24 to the inside of a housing structure 25. The other end of the lever 23 projects through a slot 26 of a bushing 27, the bushing being mounted in a cylinder 28 having one end secured to the rim of the wheel.

Slidably mounted in the bushing 27 is a piston 29 having a transverse opening 30 therein in which the free end of the lever 23 is positioned. The plunger 29 has one end projected through the rim of the wheel into engagement with the inner tube 7 as shown to advantage in Figure 3 of the drawings. The plunger is formed with a flange 31 engaged by one end of a coil spring 32 mounted on the plunger, the other end of the spring abutting the bushing 27. The spring 32 urges the plunger into engagement with the inner tube 7, the pressure of the air in the inner tube operating against the spring to normally maintain the plunger 20 out of contact with the brush 17.

However, should pressure of the inner tube decrease to the extent of releasing the tension of the spring 32, the plunger 29 will be moved radially inwardly with respect to the wheel whereby to actuate the lever 23 and project the plunger 20 outwardly into the path of the brush 17 to close the circuit leading to the lamp and thus indicate to the driver of the vehicle that the tire has become deflated beyond a normal predetermined pressure.

Movement of the plunger 29 is regulated by an adjusting screw 33 which is threaded through the outer end of the cylinder 28 and into engagement with the adjacent end of the plunger to act as a stop limiting movement of the plunger 29 under influence of pressure in the tire and thus regulate the plunger 20 relative to the brush 17.

It will be understood that each of the four wheels of the vehicle are provided with one of the switch mechanisms heretofore described including a lamp mounted on the instrument panel so that a deflation signal for each of the tires is provided.

It is believed the details of construction, advantages and manner of use of the device will be readily understood from the foregoing without further detailed explanation.

Having thus described the invention what we claim is:

1. A tire deflation signal switch for vehicle wheels comprising a stationary flexible brush carried by a stationary part of the vehicle, a reciprocable contact carried by the wheel and projectible into the path of the brush, a spring-actuated plunger contacting the inner tube of the tire and normally held inactive upon a predetermined inflation of the tire, a lever actuated by a movement of the plunger, a flexible reciprocable member operatively connecting the lever to the contact, and an adjustable stop for limiting movement of the plunger in response to pressure in the tire and also limiting separating movement of the contact.

2. A tire deflation signal switch for vehicle wheels comprising a stationary flexible brush carried by a stationary part of the vehicle, a reciprocable contact carried by the wheel and projectible into the path of the brush, a spring-actuated plunger contacting the inner tube of the tire and normally held inactive upon a predetermined inflation of the tire, said plunger having a lateral slot, a lever pivoted intermediate its ends and having one end engaged in the slot, a flexible reciprocable member connecting the other end of the lever to the contact for actuation of the latter upon movement of the plunger, and an adjustable stop for limiting movement of the plunger in response to pressure in the tire and also limiting separating movement of the contact.

3. A tire deflation signal switch for vehicle wheels comprising a stationary flexible brush carried by a stationary part of the vehicle, a reciprocable contact carried by the wheel and projectible into the path of the brush, a spring-actuated plunger contacting the inner tube of the tire and normally held inactive upon a predetermined inflation of the tire, said plunger having a lateral slot, a lever pivoted intermediate its ends and having one end engaged in the slot, a housing for the plunger and lever, a flexible reciprocable member connecting the other end of the lever to the contact for actuating the latter upon movement of the plunger, and an adjustable stop for limiting movement of the plunger in response to pressure in the tire and also limiting separating movement of the contact.

LEE CRITSER.
HOWARD G. MENCIMER.